(No Model.)
H. A. KENT.
OIL LAMP.
No. 398,163. Patented Feb. 19, 1889.
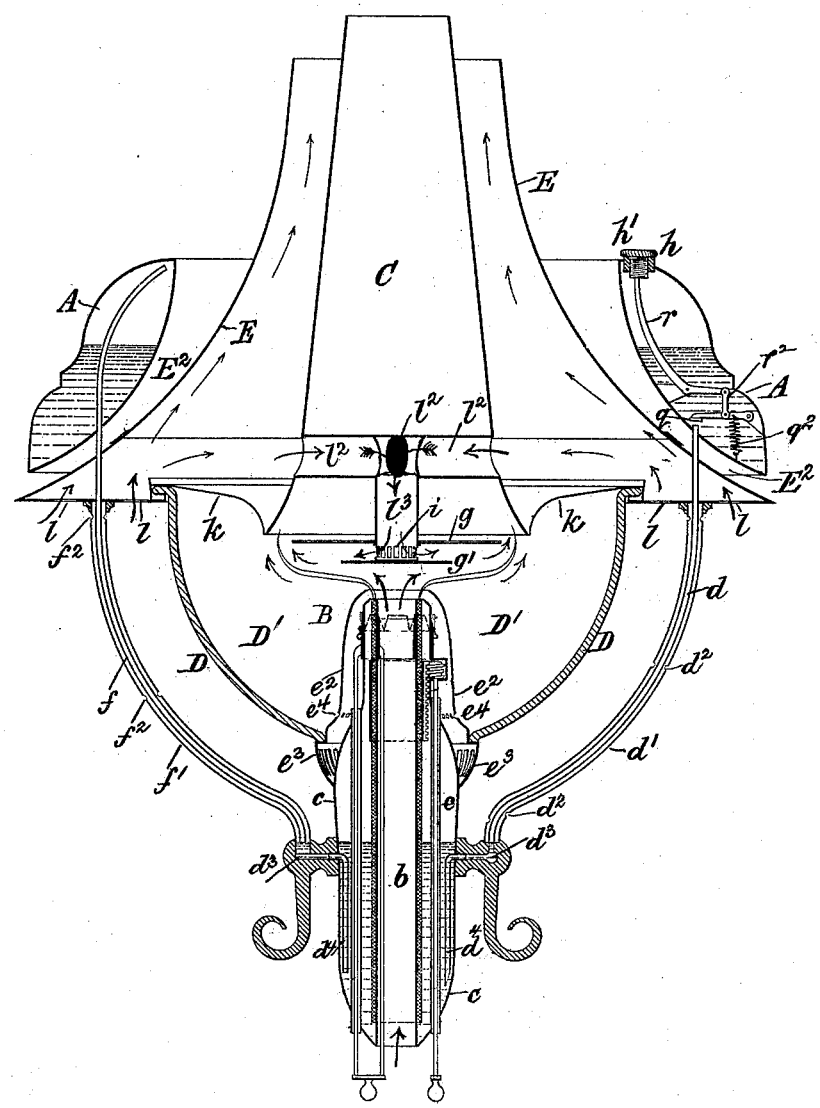
Witnesses:
Philip Mauro
C. J. Hedrick.
Inventor.
Henry Andrew Kent
by A. Pollok
his attorney.

UNITED STATES PATENT OFFICE.

HENRY ANDREW KENT, OF KINGSLAND, COUNTY OF MIDDLESEX, ENGLAND.

OIL-LAMP.

SPECIFICATION forming part of Letters Patent No. 398,163, dated February 19, 1889.

Application filed May 29, 1888. Serial No. 275,439. (No model.) Patented in England November 25, 1887, No. 16,253.

*To all whom it may concern:*

Be it known that I, HENRY ANDREW KENT, mechanician, a subject of the Queen of Great Britain, and residing at 154 Culford Road, Kingsland, in the county of Middlesex, England, have invented certain Improvements in Oil-Lamps, (for which I have obtained a patent in Great Britain, No. 16,253, dated November 25, 1887,) of which the following is a specification.

The object of my invention is to provide a lamp for burning hydrocarbon and other oil in a most effective manner, and so that a bright and steady light is obtained with perfect or practically perfect combustion. The said lamp can be arranged so that it has the general appearance of a gas-lamp with a convolvulus or outwardly - spreading saucer-shaped flame and with no large reservoir beneath the flame to obstruct the light and to cast shadows.

I will describe my invention with reference to the accompanying drawing, which represents in sectional elevation a single-burner suspension-lamp constructed according to my invention.

A is the oil-reservoir, B the burner, and C the chimney for the escape of the products of combustion. The burner contains a central tube, $b$, constituting the wick-tube on which the cylindrical wick $a$ is placed. The wick-tube $b$ is surrounded by an outer case, $c$, so as to form with the said tube a chamber, $e$, to contain oil into which the wick $a$ dips. This chamber $e$ communicates with the reservoir A by a tube, $d$, through which oil from the said reservoir passes to the annular space $d^3$, and thence by tubes $d^4$ to the chamber $e$. The chamber $e$ is also connected by an air-tube, $f$, which extends inside and to within a short distance of the top of the reservoir A and opens at its lower end into the chamber $e$ (or into a passage leading thereto, as shown) at about the height to which the oil is to be maintained therein. This tube is the only means for supplying air to the interior of the reservoir A when the lamp is in use, the air entering at the openings $f^2$ and passing down between the outer and inner tubes to and into the inner tube. The tubes $d$ and $f$ are surrounded by outer tubes, $d' f'$, which are perforated, as shown at $d^2 f^2$, for the admission of air to the tube $f$ and to keep the tubes $d$ and $f$ cool. If desired, the tube for conducting air to the interior of the oil-reservoir A may contain the tube which supplies oil from the said reservoir to the chamber $e$.

Beneath the chimney C there are provided two deflecting-disks, $g$ $g'$, between which disks are air-outlets $i$ for conducting air to the flame. If desired, one disk only, or more than two such disks, may be used with air-outlets between each. The chamber $e$ passes through and is connected to a casing, $e^2$, surrounding the upper part of the wick-tube and passing through the center of a hemispherical or equivalent glass, D, forming a transparent chamber, D', in which the flame is situated. The top of this chamber—that is, the space between the top of the glass and the base of the chimney—is covered by a plate, $k$, preferably provided with a reflecting-surface. The casing $e^2$ is perforated for the admission of air.

The lower part of the chimney is surrounded by a casing, E, having openings $l$ at bottom for the inlet of external air, and surrounding this casing is the oil-reservoir A, there being a space, $E^2$, between it and the said casing E, so that a current of cool air passes therethrough, and so keeps cool the oil in the reservoir A. The hot air from the outside of the glass D is drawn up through the space between the chimney C and the casing E, as shown by the arrows, and so is prevented from heating the reservoir A. If desired, two or more casings such as E may be provided between the oil-reservoir A and the chimney C. Air to supply the upper side of the flame passes through the openings $l$ into tubes $l^2$, traversing the chimney, (becoming therein heated by the products of combustion passing therearound up the chimney,) and thence passing by the tube $l^3$ out by the openings $i$. The wick-tube $b$, which is open throughout, serves to admit air to the inner side of the flame, and also as a passage up which to pass a lighting appliance for lighting the lamp without removing the glass. Air passes to the upper side of the flame also through this tube $b$. Air for the lower side of the flame is admitted into the space between the casing $e^2$ and the upper part of the wick-tube and oil-chamber by first passing through the openings $e^3$ into the casing $e^2$, and thence partly through openings $e^4$ in the lower part of the cap, into the chamber D' and partly out at the top of the casing $e^2$ and impinges on the outer side of the flame, heated air being at the same time supplied to the upper side of the flame by the arrangement of regenerative tubes or passages hereinbefore described. The oil-reservoir A is charged with oil through the opening $h$, fitted with a screw-plug, $h'$, and in order to prevent, when the reservoir is being charged, the oil from passing through the tube $d$ into the chamber $e$, the said tube may be provided with a stop-cock to cut off the communication during charging the reservoir A. I prefer, however, to provide an automatic arrangement for the purpose, as is shown in the drawing, and consisting of a valve, $q$, which, when the plug $h'$ is withdrawn for the purpose of charging the reservoir, will be released and allowed to fall by its own gravity, or by the action of a spring, $q^2$, so as to close the mouth of the tube $d$.

When the plug $h'$ is inserted into the opening $h$ and screwed home, the lower end of the said plug will bear upon and depress one arm of a bell-crank lever, $r$, to the other arm of which the valve $q$ is attached by a link, $r^2$, and thereby raise the said valve from the tube $d$ and admit of the oil flowing into the chamber $e$. When the oil rises to such a level in the chamber $e$ as to cover the lower end of the air-tube $f$, the oil will cease to flow from the reservoir, as the access of air to the interior of the reservoir is thereby cut off. So soon, however, as so much of the oil is consumed that it uncovers the end of the tube $f$ air will enter the reservoir A and oil will again flow into the chamber $e$ until the opening of the said tube is again covered, and thus the oil in the chamber $e$ is maintained at about a uniform level.

The lower end of the tube $d$ may have a float-valve or other analogous arrangement to close the end of the said oil-tube when the oil rises in the said chamber to the requisite height.

Lamps constructed according to my invention are free from danger of explosion by reason of the oil being kept cool and always at or about the same level in the chambers into which the wick dips. They give great light with comparatively small consumption of oil, and, moreover, they throw no or but little shadow. The lamps constructed according to my invention or the essential features thereof, as hereinafter claimed, are adapted for use for any purpose for which oil-lamps are used for either lighting or heating.

Having now particularly described and ascertained the nature of my said invention and in what manner the same is to be performed, I declare that what I claim is—

1. In an oil-lamp, the combination, with the oil-reservoir above the burner and small oil-receptacle below the same, of a chimney and a casing between the oil-reservoir and chimney, said casing being perforated at the bottom, so that air can pass up between it and the chimney, and being separated from said reservoir by a free space, so that air can enter at the bottom of the reservoir between it and said casing and pass upward to keep the oil in the reservoir cool, substantially as described.

2. The combination, with the oil-reservoir above the burner, of an inclosing glass globe, a burner, a chimney having transverse air-tubes and a vertical air-tube, and a casing interposed between the chimney and reservoir and having air-inlets on its under side, so that air heated by contact with the globe may pass up inside the casing and to the burner through the chimney-tubes, while cool air passes outside said casing between it and the reservoir, substantially as described.

3. The combination of the casing having air-inlets on its under side, the globe beneath the casing, the chimney within the casing provided with air-tubes for supplying air to the upper side of the flame, the flame-spreader and air-distributer, the central air-tube passing through said globe, and the perforated casing surrounding said air-tube, substantially as described.

4. The combination of the chimney having transverse and vertical air-tubes, a flame-spreader closing the lower end of the vertical tube, a second flame-spreader above the first and extending beyond the same, said vertical tube having air-openings between said flame-spreaders, the central air-tube for supplying air from below, the oil-chamber inclosing the same, the perforated casing, and the inclosing-globe, substantially as described.

5. The combination of the burner, the glass globe beneath and around the burner, the oil-reservoir above the burner, the chimney provided with air-passages, the air-tubes passing centrally through said globe, the casing inclosing said air-tube and forming therewith a small oil-chamber, a pipe connecting this chamber with the upper oil-reservoir, and the perforated casing for supplying air to the under side of the flame, substantially as described.

6. The combination of the upper reservoir, the chimney, the casing between said reservoir and chimney, the glass globe, and the reflector extending from said chimney to the rim of said globe, said casing overhanging said globe and being provided with perforations on its under side, so that air heated by contact with said globe may pass within said casing, substantially as described.

In testimony whereof I have signed my name to this specification in the presence of two subscribing witnesses.

HENRY ANDREW KENT.

Witnesses:
    FRED GOATER,
    E. A. HALL,
        *Both of 9 Birchin Lane, London.*